US005550673A

United States Patent [19]
Goldstein

[11] Patent Number: 5,550,673
[45] Date of Patent: Aug. 27, 1996

[54] SPYHOLE VIEWER

[76] Inventor: Pinchas Goldstein, 59 Shaulson St., Jerusalem, Israel

[21] Appl. No.: 276,620

[22] Filed: Jul. 18, 1994

Related U.S. Application Data

[63] Continuation-in-part of Ser. No. 968,525, Oct. 29, 1992, Pat. No. 5,357,367.

[30] Foreign Application Priority Data

Nov. 1, 1991 [IL] Israel .......................................... 099941
Sep. 15, 1993 [IL] Israel .......................................... 107023

[51] Int. Cl.⁶ ............................ G02B 23/02; G02B 25/04
[52] U.S. Cl. ........................ 359/367; 359/400; 359/431; 359/504; 359/599; 359/707; 359/836; 359/857
[58] Field of Search ..................................... 359/399, 400, 359/402, 405, 431, 504, 506, 834, 835, 836, 857, 894, 707, 367, 599

[56] References Cited

U.S. PATENT DOCUMENTS

| | | |
|---|---|---|
| 3,145,249 | 8/1964 | Meltzer . |
| 3,251,262 | 5/1966 | Ellenberger . |
| 3,434,773 | 3/1969 | Pitchford . |
| 3,910,676 | 10/1975 | Fojtik et al. . |
| 3,973,835 | 8/1976 | Miyakawa et al. . |
| 4,082,434 | 4/1978 | Hayashi et al. . |
| 4,251,127 | 2/1981 | Yamaguchi . |
| 4,257,670 | 3/1981 | Legrand . |
| 4,269,474 | 5/1981 | Kamimura . |
| 4,348,083 | 9/1982 | Kamimura . |
| 4,431,277 | 2/1984 | Lewandowski . |
| 4,561,116 | 12/1985 | Neyret . |
| 4,688,905 | 8/1987 | Okamura . |
| 4,726,670 | 2/1988 | Sherrard . |
| 4,730,911 | 5/1988 | Wood et al. . |
| 4,761,065 | 8/1988 | Lee . |
| 4,869,021 | 9/1989 | Gregory . |
| 4,892,399 | 1/1990 | Ahn . |
| 4,964,711 | 10/1990 | Degnan . |
| 5,157,553 | 10/1992 | Phillips et al. . |
| 5,357,367 | 10/1994 | Goldstein ................................ 359/400 |

FOREIGN PATENT DOCUMENTS

| | | |
|---|---|---|
| 0540307 | 5/1993 | European Pat. Off. . |
| 60-069606 | 4/1985 | Japan . |
| 61-245125 | 10/1986 | Japan . |
| 62-052521 | 3/1987 | Japan . |
| 62-191815 | 8/1987 | Japan . |
| 63-141015 | 6/1988 | Japan . |
| 0182323 | 9/1963 | Sweden . |
| 0913894 | 12/1962 | United Kingdom . |
| 0971867 | 10/1964 | United Kingdom . |
| 86-01908 | 3/1986 | WIPO . |

Primary Examiner—Ricky D. Shafer
Attorney, Agent, or Firm—Greenblum & Bernstein P.L.C.

[57] ABSTRACT

A spyhole viewer for a door or wall, includes an objective system for producing a real, inverted image. The objective system is mounted in a tubular member fixedly installable in the door or wall. An erector is provided for inverting the inverted image of the objective system and is located behind at least one of the elements of the objective system. At least one reflector is provided for angularly deflecting the light beams from the objective system, and a housing is fixedly attachable to the tubular member for accommodating at least the erector and the reflector. A viewing lens is provided for magnifying the real image as inverted by the erector means. The viewing lens is adapted to swivel in a substantially vertical plane about an imaginary horizontal axis at a radius of swivel at least approximately equal to the length of the light path from the image-side focal plane of the objective system to the first principal plane of the viewing lens.

19 Claims, 3 Drawing Sheets

SPYHOLE VIEWER

CROSS REFERENCE TO RELATED APPLICATION

The present application is a continuation in-part of U.S. patent application Ser. No. 07/968,525, filed on Oct. 29, 1992, now patent No.5,357367, the entire disclosure of which is expressly incorporated herein by reference in its entirety.

The present invention relates to a spyhole viewer mountable in doors, walls, etc.

BACKGROUND OF THE INVENTION

Such viewers are known, in particular from U.S. Pat. Nos. 4,726,670 and 4,892,399. These viewers are superior to earlier spyhole devices inasmuch as both have optics that produce real, projectable images which can be observed from some distance, as distinct from the earlier devices that produced virtual images which required the user's eye to be close to the eyepiece.

Yet both the the above prior-art viewers suffer from disadvantages that reduce their usefulness. Both devices, and in particular the device described in U.S. Patent. Nos. 4,892,399, require large holes to be provided in the door, in the case of the latter, mainly due to the use of a double Dove prism 9, 9' as erector element, even a stepped, two-diameter hole very difficult to produce and certainly unsuitable for do-it-yourself installation, with retrofitting, starting out from an existing, relatively small bore being a very tricky business even for an expert.

Apart from the above difficulties, such a large opening also constitutes a definite danger as, by knocking out the viewer, access may be gained for tampering with the door lock from the inside of the door.

The viewer according to U.S. Pat. No. 4,726,670 has several more disadvantages. Its optical system is clearly not a wide-angle system, very important for this sort of application, and in both disclosures the efficiency of their ground-glass screen is severely compromised by its being exposed to ambient light, which greatly reduces contrast.

A further drawback is common to both disclosures: the orientation of the optical axis is fixed. For closer viewing, this forces taller users to stoop, while users of smaller stature may have to stand on their toes and even when viewing the screen from a larger distance, truly satisfactory results are obtained only when the diffusing screen is viewed in a direction more or less perpendicular thereto.

SUMMARY OF THE INVENTION

It is one of the objects of the present invention to provide a wide-angle spyhole viewer that fits a relatively small hole which in many cases already exists. It is a further object of the invention to provide a viewer that uses erector elements permitting the use of a relatively small entrance pupil and protects its image screen from incident light thereby improving image contrast, and that permits the optical axis of the viewing side of the device to be tilted to best accommodate the individual user.

According to the invention, this is achieved by providing a spyhole viewer for a door or wall, comprising an objective system for producing a real, inverted image and mounted in a tubular member fixedly installable in said door or wall; erector means for inverting said inverted image and located behind at least one of the elements of said objective system; at least one reflector means for angularly deflecting the light beams from said objective system; a housing fixedly attachable to said tubular member and accommodating at least said erector means and said reflector means, and a viewing lens for magnifying said real image as inverted by said erector means, characterised in that said viewing lens is adapted to swivel in a substantially vertical plane about an imaginary horizontal axis at a radius of swivel at least approximately equal to the length of the light path from the image-side focal plane of said objective to the first principal plane of said viewing lens.

The invention further provides a spyhole viewer for a door or wall, comprising an objective system for producing a real, inverted image and mounted in a tubular member fixedly installable in said door or wall; erector means for inverting said inverted image and located behind at least one of the elements of said objective system; at least one reflector means for angularly deflecting the light beams from said objective system; an image surface upon which said real image will appear; a housing fixedly attachable to said tubular member and said erector means, said image surface, said reflector means and viewing lens for magnifying said real image as inverted by said erector means, characterised in that said image surface can be selectively swung out of the path of light rays coming from said objective.

The invention will now be described in connection with certain preferred embodiments with reference to the following illustrative figures so that it may be more fully understood.

BRIEF DESCRIPTION OF THE DRAWING

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the drawings:

FIG. 3 is a side view as seen in the direction of arrow B in

FIG. 1, and FIG. 4 is a side view of another embodiment of the spyhole viewer according to the invention.

DESCRIPTION OF THE PREFERRED EMBODIMENT

Figure 1:
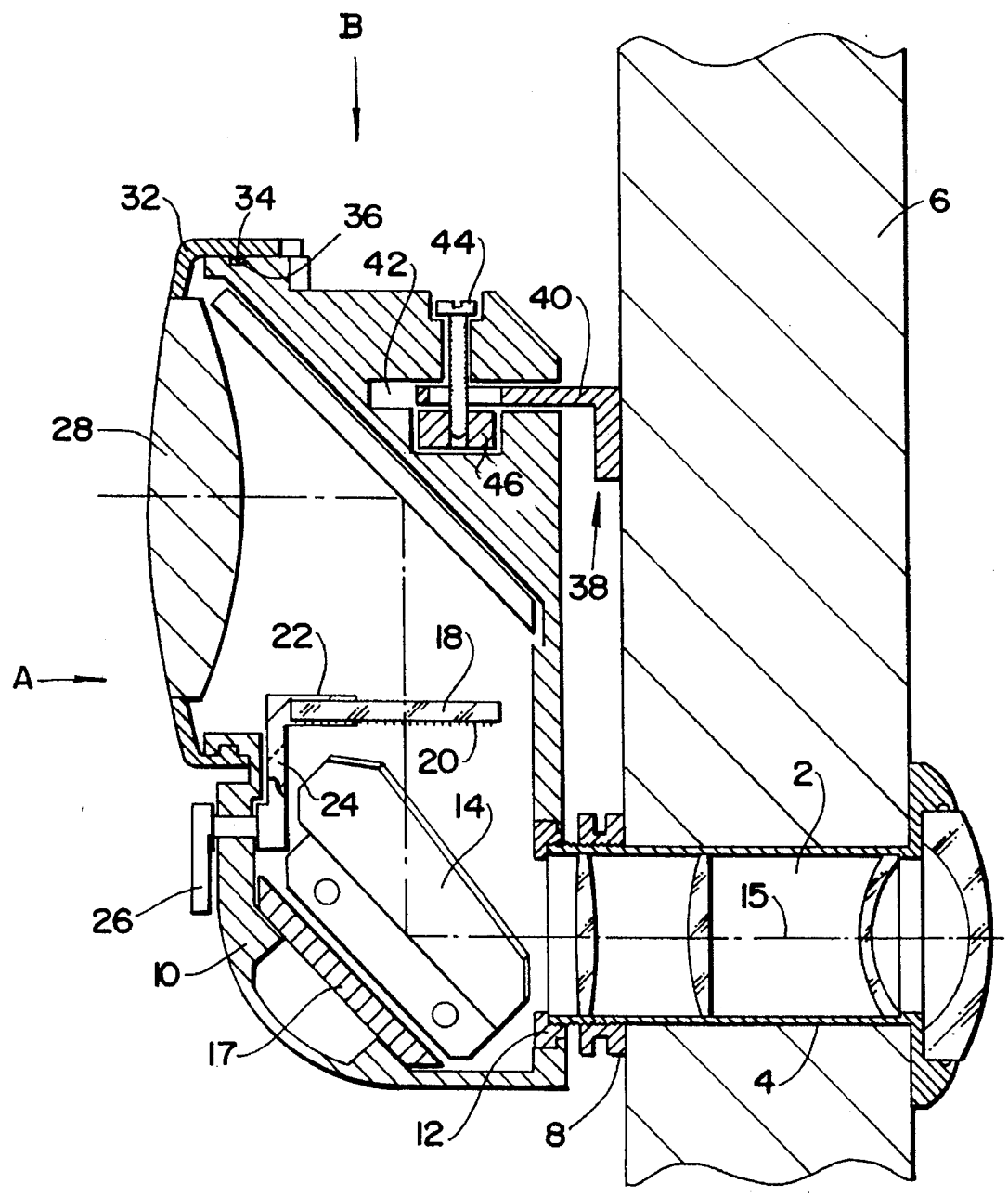
FIG. 1 is a schematic top view of a first embodiment of the spyhole viewer according to the invention.

Referring now to the drawings, there is seen in FIG. 1 a multi-lens, wide-angle objective system 2 mounted in a tubular member 4 which is inserted into the door 6 and locked in position by a threaded ring 8. In this representation, the room is located to the left of the door 6.

The housing 10, advantageously made of one of the engineering plastics, is attached to the tubular member 4 via a molded-in metal ring 12. The housing 10 accommodates the erector 14 which, in this embodiment, is a hollow roof mirror, the equivalent of a roof or Amici prism. The erector 14 inverts the inverted image produced by the objective system and deflects the optical axis 15 by 90°.

The second component fixedly mounted in the housing 10 is a reflecting mirror 16 which deflects the optical axis 15 for a second time. Advantageously, this mirror is a first-surface mirror.

Between the erector 14 and the reflecting mirror 16, at the image-side focal plane of the objective system 2, there is located a planar screen 18 with a diffusing surface 20 on which materializes the real image produced by the objective system 2, after having been inverted by the erector 14. Advantageously, the screen 18 is a planar glass plate with a ground surface 20. The screen 18 is mounted in a holder 22 at the end of an arm 24 which, with the aid of a handle 26 at the outside of the housing 10, can be swiveled, thereby, for a purpose to be explained further below, removing the screen 18 from the light path between the erector 14 and the reflecting mirror 16.

An optional is the provision of a protective, bullet-proof plate 17.

A further optical component of the spyhole viewer according to the invention is a viewing lens 28 mounted in a frame 32 articulated to the housing 10 in such a way that the viewing lens 28 can be tilted or swiveled downwards ("into the paper") and upwards (see also FIGS. 2 and 3) for the convenience of users of different heights, as already explained.

This swiveling feature is realized by per se known means, e.g., a projection 34 at the inside of the frame 32 which rides in an arcuate groove 36 provided in the part of the housing 10 on which the frame is seated For satisfactory optical results, this arcuate groove 36 should have a radius at least approximately equal to the distance, along the optical axis, between the focal plane of the objective system 2, that is, the diffusing surface 20 of the screen 18, and the viewing lens or, to be accurate, the first principal plane of the viewing lens.

For verticality of the object to be preserved also in the image, the optical axis between the erector 14 and the reflecting mirror 16 must be strictly horizontal, as a deviation from the horizontal will produce a deviation 2a from the verticality of the image. To lock the housing 10, once adjusted, in position, there is provided an L-shaped piece 38 attached to the door 6, advantageously with a piece of two-sided adhesive tape. The longer limb 40 of the L-piece 38 enters with clearance into a slot 42 provided in the housing 10. A relatively large opening in the limb 40 permits a screw 44 to pass across the limb 40 after leveling of the housing 10, allowing also for variations in the thickness of the door, and to pull up a nut 46, locking the housing 10 in position.

Figure 2:
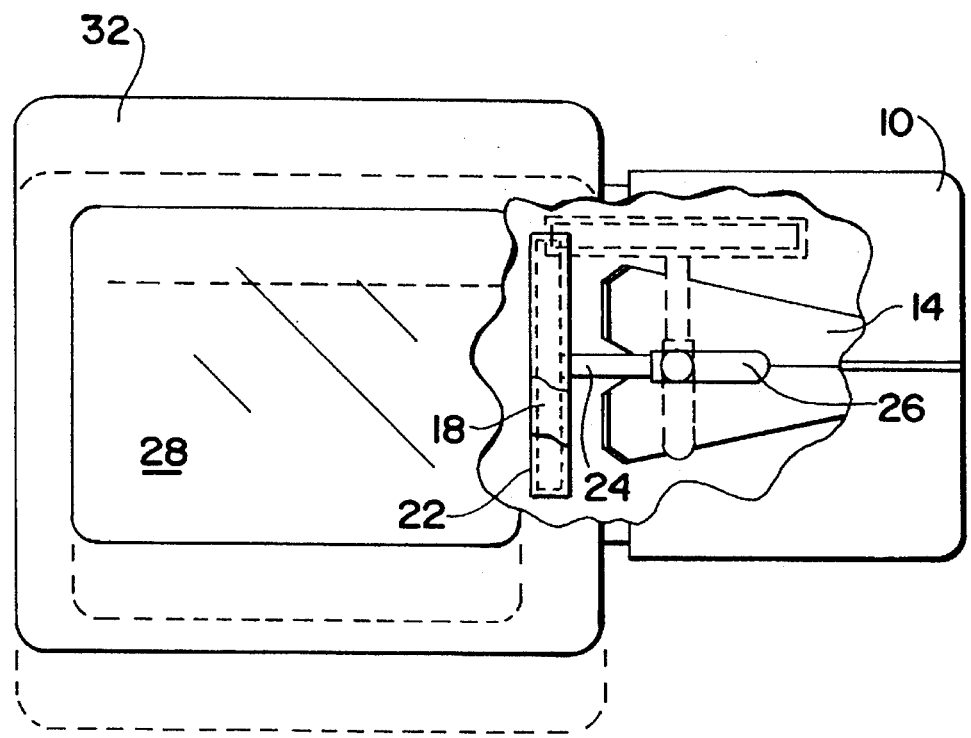
FIG. 2 is a front view as seen in the direction of arrow A FIG. 1.

FIG. 2 is a front view seen in the direction of arrow A in FIG. 1. Seen are the frame 32 and the viewing lens 28 in the normal position (solid lines) and in the downward tilted position (broken lines). In the cut-open housing 10 there are also seen the screen 18, its mounting 22, arm 24 and handle 26 in the active position of the screen 18 (solid lines) and in the swung-out position (broken lines).

Figure 3:
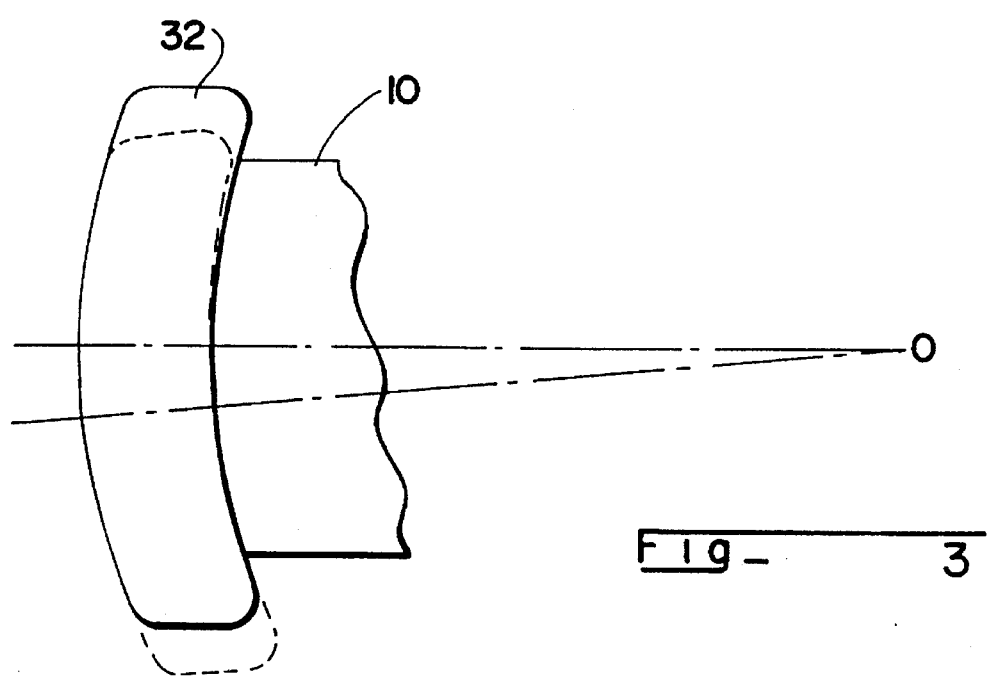

FIG. 3 is a side view as seen in the direction of arrow B in FIG. 1, with the frame 32 in the normal position (solid lines) and in the downwards tilted position (broken lines). Point O is the center of swivel as defined above.

Figure 4:
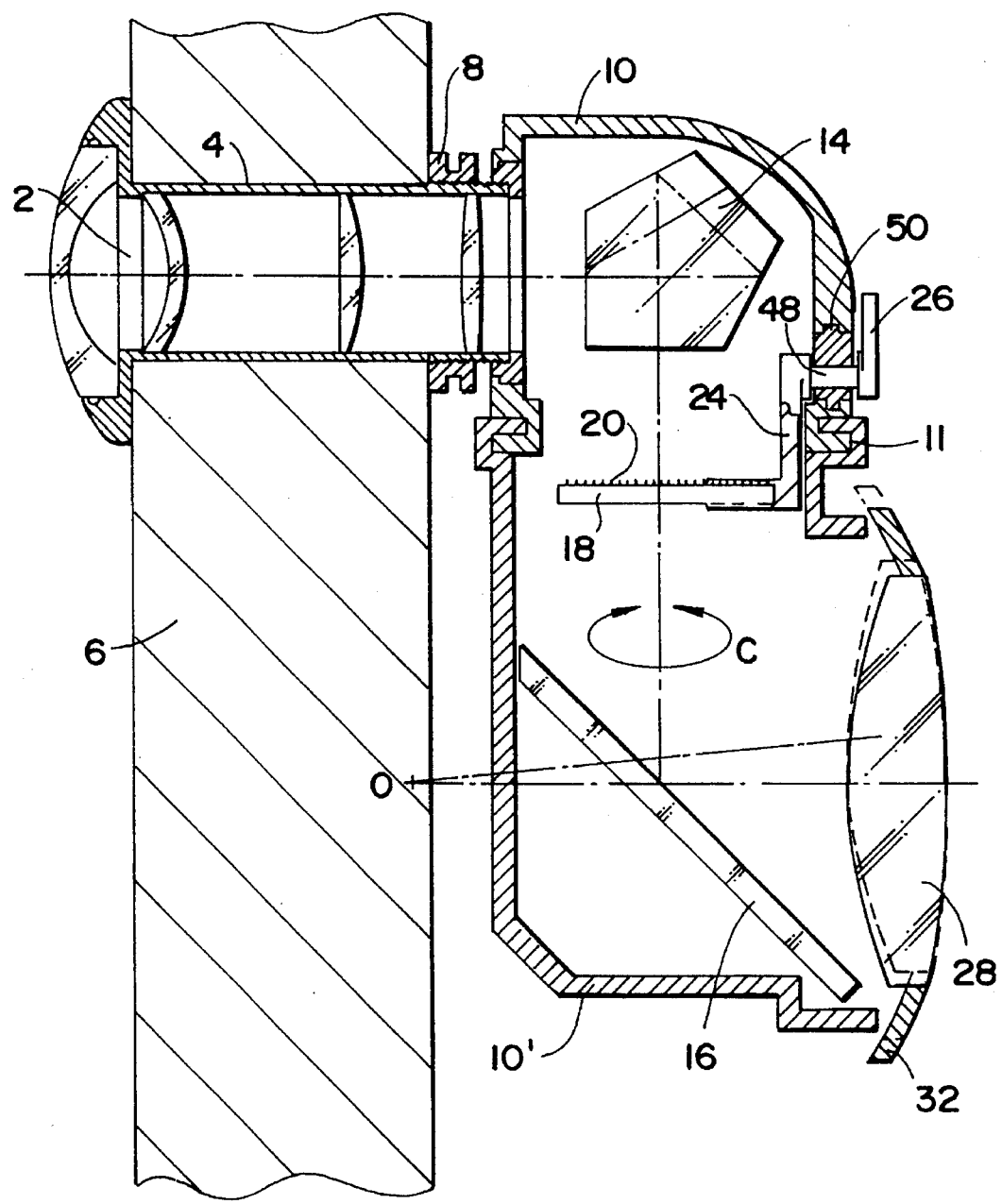

Another embodiment of the spyhole viewer according to the invention is schematically represented in FIG. 4 which, it should be noted, is a side view, not a top view as is FIG. 1. The substantial differences between the two embodiments are the following:

The erector 14 is now a roofed penta prism rather than the hollow roof mirrors of the embodiment of FIG. 1. This has certain advantages: while the mirror device inverts the image only in the vertical meridian (upside in the object is upside in the image, but right in the object is left in the image), the roof penta prism inverts also in the horizontal meridian (right in the object is also right in the image). This enables the viewer inside the room to read identification documents presented to the objective.

Another advantage of this embodiment is a purely aesthetic one: the device extending vertically downwards from the tubular member (as against the previous embodiment which extends horizontally sideways), symmetry of the door surface is preserved.

The housing is a split housing 10, 10', with a joint 11 that gives the lower housing part 10' one degree of freedom in rotation about the vertical axis (see double arrow C), allowing the viewing lens 28 to be swiveled about this axis for an angular extent of ±90°. This permits viewing also from positions other than precisely opposite to the door. Furthermore, the shaft 48 of the screen tilting assembly is mounted in an eccentric bore in a disk 50. By rotating the disk 50, the position of the diffusing surface 20 of the screen can be accurately adjusted to coincide with the focal plane of the objective system 2.

In this embodiment, too, the viewing lens 28 can be tilted upwards and downwards using a similar mechanism. In both embodiments, the position of the viewing lens, once adjusted, is maintained by friction or by detents in the form of serrations.

Ordinarily, the visitor at the door 6 is viewed with the screen 18 in position, as shown in FIG. 1. At normal light conditions, the image produced by the objective system 2 on the diffusing surface 20 of the screen 18 is sufficiently bright, with the viewing lens 28 magnifying the image with sufficient clarity to permit identification. Moreover, the interposition, in the light path, of the diffusing screen 18 prevents the person on the other side of the door from viewing the room or any details therein, or from identifying the person inside the room who is viewing him or her. However, with subnormal light conditions, or when greater details are required for identification (e.g., identity cards and the like), it is necessary to swing the screen 18 out of the light path, producing a bright and brilliant image.

At this point it is important to stress the fact that the viewer according to the invention is not a telescope in which an objective produces an image in its focal plane, which is then re-imaged by the eyelens at infinity, where it may be comfortably viewed by the relaxed eye. In other words, in an (astronomical) telescope, the focal plane of the objective (in this case, the objective system 2) and the focal plane of the eyelens (in this case, the viewing lens 28) would have to coincide. This, however, would produce several unwanted results:

1. The viewing lens would produce, on the screen 18, an image of at least some regions of the room and this image would be available to the person at the door;

2. As an optical system works in both directions, removal of the screen 18 would have a similar effect on the person looking into the objective system 2 from the outside, and on the viewer inside the room.

For this reason, the focal plane of the viewing lens 28 is not located on the diffusing surface 20 of the screen 18, but way beyond, towards the objective system 2. In fact, the distance, along the optical axis, between the viewing lens 28 and the diffusing surface 20 of the screen 18, is only about ⅔ of the total focal length of the viewing lens 28. As a result, the viewing lens 28 will not produce a usable image on the surface 20. Furthermore, when the screen 18 is removed, the image obtained by the viewer in the room would be quite satisfactory, while the image available to the person outside of the room would greatly suffer from lack of sharpness, particularly at magnifications higher than 1. Similarly, while the view through the viewing lens provides a field of about 60°, the view through the objective system 2 provides a field of view which is proportional to the reciprocal value of the square of the magnification. If the latter is about 3x, the field of view would be 60/9≈6.6°.

It is clear that at least some of the lens components could also be aspherical, and that at least some of the optical components could be plastic.

It should be noted that the roofed penta prism 14 could also be realized by means of mirrors.

The fine-focusing arrangement using the disk 50 with the eccentric bore would obviously also be used in the embodiment of FIG. 1.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A spyhole viewer for a door or wall, comprising:

an objective system, comprising a plurality of optical elements, for producing a real, inverted image, said objective system mounted in a tubular member fixedly installable in the door or wall;

erector means for inverting said inverted image and located behind at least one of said optical elements of said objective system;

reflector means for angularly deflecting light beams from said objective system;

a housing fixedly attachable to said tubular member and accommodating at least said erector means and said reflector means;

a viewing lens for magnifying said real image as inverted by said erector means; and an image surface, for said real image to appear upon, said image surface located between said erector means and said reflector means and comprising a diffusing surface of a transparent planar plate.

2. The spyhole viewer as claimed in claim 1, wherein said objective system is a multi-element, wide-angle system.

3. The spyhole viewer as claimed in claim 2, wherein at least one element of said objective system is an aspherical element.

4. The spyhole viewer as claimed in claim 1, wherein said reflector means is a plane mirror arranged to deflect an optical axis by approximately 90° and is mounted in said housing in proximity to said viewing lens.

5. The spyhole viewer as claimed in claim 1, wherein said erector means is a prism-type erector mounted in said housing.

6. The spyhole viewer as claimed in claim 5, wherein said prism-type erector is a roofed penta prism.

7. The spyhole viewer as claimed in claim 1, wherein said erector means is a mirror-type erector mounted in said housing.

8. The spyhole viewer as claimed in claim 1, wherein said erector means is a mirror arrangement, said mirror arrangement comprising means for providing an optical effect of a roofed penta prism.

9. The spyhole viewer according to claim 1, said viewing lens being adapted to swivel in a substantially vertical plane about an imaginary horizontal axis at a radius of swivel at least approximately equal to a length of a light path from an image side focal plane of said objective system to a first principal plane of said viewing lens.

10. The spyhole viewer according to claim 1, said image surface comprising a ground surface.

11. A spyhole viewer for a door or wall, comprising:

an objective system, comprising a plurality of optical elements, for producing a real, inverted image and mounted in a tubular member fixedly installable in the door or wall;

erector means for inverting said inverted image and located behind at least one of said optical elements of said objective system;

reflector means for angularly deflecting light beams from said objective system;

an image surface upon which said real image will appear;

a housing fixedly attachable to said tubular member and housing said erector means, said image surface, said reflector means and a viewing lens for magnifying said real image as inverted by said erector means, wherein said image surface can be selectively swung out of a path of light beams coming from said objective system.

12. The spyhole viewer as claimed in claim 11, said viewing lens is adapted to swivel in a substantially vertical plane about an imaginary horizontal axis.

13. The spyhole viewer as claimed in claim 12, wherein said viewing lens is adapted to swivel about said horizontal axis at a radius of swivel at least approximately equal to a length of a light path from a image-side focal plane of said objective system to a first principal plane of said imaging lens.

14. The spyhole viewer as claimed in claim 13, wherein said length of said light path is shorter than the first focal length of said viewing lens.

15. A spyhole viewer for a partition, comprising:

an objective system comprising a plurality of optical elements, said objective system producing a real, inverted image and mounted in a tubular member fixedly installable in the partition;

erector means for inverting said inverted image, said erector means located behind at least one of said optical elements of said objective system;

reflector means for angularly deflecting light beams from said objective system;

a diffusing surface of a transparent planar plate located between said erector means and said reflector means for said real image to appear upon:

a housing fixedly attachable to said tubular member and accommodating at least said erector means and said reflector means; and a viewing lens for magnifying said real image as inverted by said erector means, said viewing lens having a focal length and being positioned such that a subject imaged by said objective system is visible through said viewing lens while a subject imaged by said viewing lens is not visible through said objective system.

16. The spyhole viewer according to claim 15, wherein a distance along an optical axis between said diffusing surface and said viewing lens being less than a focal length of said viewing lens along said optical axis.

17. The spyhole viewer according to claim 16, further comprising means for selectively swinging said diffusing surface out of a path of light beams from said objective system.

18. The spyhole viewer according to claim 15, said reflector means comprising a plane mirror positioned to deflect an optical axis by approximately 90 degrees and mounted in said housing in proximity to said viewing lens.

19. The spyhole viewer according to claim 15, said objective system comprising a multi-element wide angle optical system.

* * * * *